(12) United States Patent
Capomaggio

(10) Patent No.: US 8,700,827 B2
(45) Date of Patent: Apr. 15, 2014

(54) MATCHING METHOD, SYSTEM AND DEVICE FOR DATA EXCHANGE BETWEEN A COMMUNICATION OBJECT AND A PROCESSING UNIT

(75) Inventor: Grégory Capomaggio, Roquevaire (FR)

(73) Assignee: Gemalto SA, Meudon (FR)

( * ) Notice: Subject to any disclaimer, the term of this patent is extended or adjusted under 35 U.S.C. 154(b) by 107 days.

(21) Appl. No.: 13/498,445

(22) PCT Filed: Sep. 24, 2010

(86) PCT No.: PCT/EP2010/064194
§ 371 (c)(1),
(2), (4) Date: Mar. 27, 2012

(87) PCT Pub. No.: WO2011/039123
PCT Pub. Date: Apr. 7, 2011

(65) Prior Publication Data
US 2012/0185622 A1      Jul. 19, 2012

(30) Foreign Application Priority Data

Sep. 30, 2009   (EP) .................................... 09305924

(51) Int. Cl.
*G06F 3/00*       (2006.01)
*G06F 13/00*      (2006.01)

(52) U.S. Cl.
USPC ............. 710/62; 710/2; 710/5; 710/8; 710/15

(58) Field of Classification Search
None
See application file for complete search history.

(56) References Cited

U.S. PATENT DOCUMENTS

| | | | |
|---|---|---|---|
| 6,945,454 | B2 | 9/2005 | Tournemille et al. |
| 6,978,335 | B2 | 12/2005 | Lee |
| 2002/0011516 | A1 | 1/2002 | Lee |
| 2004/0211835 | A1 | 10/2004 | Tournemille et al. |

(Continued)

FOREIGN PATENT DOCUMENTS

| | | |
|---|---|---|
| EP | 1 473 664 A2 | 11/2004 |
| WO | WO 02/03312 A2 | 1/2002 |

OTHER PUBLICATIONS

International Search Report (PCT/ISA/210) mailed on Oct. 29, 2010, by the European Patent Office as the International Searching Authority for International Application No. PCT/EP2010/064194.

(Continued)

*Primary Examiner* — Scott Sun
(74) *Attorney, Agent, or Firm* — Buchanan Ingersoll & Rooney PC

(57) ABSTRACT

A matching device carries out data exchange between a processing unit and a wireless peripheral device and/or a communication object associated with the peripheral device. The matching device includes a communication interface with the processing unit; a wireless communication interface with the wireless peripheral device; information stating means for stating technical capacity information to the processing unit, enabling the latter to select an appropriate driver/communication means; and data-processing means. The data-processing means is capable of carrying out a matching of an exchange protocol and/or formats of data to be exchanged between the processing unit and the communication object. The technical capacities stated by the stating means pertains to the wireless peripheral device and/or to the communication object associated therewith, the technical capacities being considered to pertain to the matching device by the processing unit. The invention also pertains to a system and method for implementing the matching device.

18 Claims, 2 Drawing Sheets

(56) References Cited

U.S. PATENT DOCUMENTS

2006/0101186 A1    5/2006  Lee
2009/0083451 A1*   3/2009  Keohane ........................ 710/11
2009/0286489 A1*   11/2009 Racherla et al. ............. 455/74.1

OTHER PUBLICATIONS

Written Opinion (PCT/ISA/237) mailed on Oct. 29, 2010, by the European Patent Office as the International Searching Authority for International Application No. PCT/EP2010/064194.

* cited by examiner

MATCHING METHOD, SYSTEM AND DEVICE FOR DATA EXCHANGE BETWEEN A COMMUNICATION OBJECT AND A PROCESSING UNIT

The present invention pertains to a method and a system for enabling a data exchange between a communication device and a processing unit. More particularly, the invention pertains to a matching device for enabling such data exchange.

The invention is more particularly applied to the identification market. The market of identification, also known as "IAM" (Identity and Access Management), relies on several advanced technologies enabling users to be authenticated with some computer equipment of the personal computer, mobile telephone, personal assistant type, etc.

One among such technologies consists in using a secure chip card linked with one and only one user, and containing the information required for authenticating the latter, such as digital certificates, encryption keys, passwords or biometric information.

To access the information or some applications contained in the computer equipment itself or in the local computer network, the user must insert his/her chip card into the computer system. The computer system is then able to check that the information contained in the chip card actually pertains to the user requesting access. Such operation is referred to as the user's "low authentication".

In some cases, a password or an additional biometric check is requested by the computer system in order to check that the chip card holder actually is the user concerned. Such operation is referred to as the user's "high authentication". The type of authentication depends on the security policy implemented for a dedicated infrastructure.

The information contained in the chip card is read through a dedicated peripheral device called "chip card reader". Such peripheral device can be an external or an internal peripheral device, which is most often connected to the computer equipment through a wire connection such as the USB link or the RS232 link.

In some environments where the users' mobility is important, using such peripheral device is highly inappropriate. This is most particularly the case for hospital infrastructures wherein the nursing staff must be in a position to be authenticated by a multitude of work stations connected within the hospital, in order to have access to some confidential data such as the patients' medical records. During such utilization, the recurrent handling of the chip card becomes tedious, and may lead to a security breach if the user forgets his/her chip card inserted into the reader, which would enable a malevolent person to have access to the same information subsequently.

In some specialized services, handling the chip. card and using the reader is simply prohibited so as to avoid the propagation of some germs which could develop inside the reader itself.

In order to satisfy this requirement, the inventor imagined new peripheral devices solutions in order to enable a quicker and more ergonomic user's authentication while reinforcing the security level.

Such solutions consist in providing the user with a socalled "mobile" chip card reader, wherein the user's chip card is inserted, in order to communicate with a remote station through a short or medium range radiofrequency link such as Bluetooth, WiFi or wireless USB.

Such peripheral device enables the user to move from one work station to another while keeping the device on him/her and not having to handle the chip card. To communicate with the mobile peripheral device, the computer equipment must be equipped with a compatible radiofrequency interface.

Two options have been considered in the prior art to communicate with the mobile card reader: the computer equipment is either provided with a compatible internal radiofrequency peripheral device, in which case it can be used for communicating with the mobile reader, or, on the contrary, the communication interfaces of the computer equipment have to be extended by adding an external peripheral device, such as, for instance, a USB-Bluetooth, USB-WiFi, or USB-Wireless-USB device.

In order to provide interoperability between the computer systems and the chip card technology-based solutions, several applicative communication interfaces, also known as API for "Application Programming Interface", are currently standardized and implemented in most systems.

One of such applicative communication interfaces, known as CCID for "Integrated Circuit(s) Cards Interface Device" enables any computer equipment to access information contained in a chip card through a USB link connected reader. In this case, the chip card reader integrator is never forced to install driver software, also called a driver, in order to be recognized by the system, if the reader implements an interface compatible with the CCID specification.

Such CCID interface is imbedded by default in most operation systems such as Windows, Mac OS or Linux, used by most computer stations.

On the other hand no applicative, whether standardized or large-scale, communication interface currently exists on wireless technologies-based computer equipment.

Wireless communication technology-based chip card reading peripheral devices, such as the above-mentioned mobile reader being developed, actually poses a problem of interoperability.

This would force the mobile reader manufacturer to develop and install its software driver in given computer equipment. This operation becomes all the more complex as the driver will have to be available in several versions, according to the operation system used or the physical model of the peripheral device existing in the computer equipment, which would make the maintenance of the solution in a heterogeneous computer population more complicated.

In certain cases, deploying this type of solution may be difficult, or even impossible. This is more particularly the case for computer infrastructures, the software migration or updating of which must be carried out on a large scale, which implies high action costs, or must be limited to a particular security policy in order to minimize software incompatibility resulting from such updating.

Generally speaking, the inventor thinks that today there is a need for local computer equipment able to directly communicate with wireless mobile peripheral devices. For instance, a computer must be capable of communicating with a peripheral device, such as a smart badge, if a Bluetooth and NFC interface is provided in such peripheral device.

Besides, such wireless mobile peripheral devices may require means for quickly and safely setting up the connection with the local computer.

In practice, the inventor thinks that the above-mentioned operation principle has a drawback in that it requires multiple developments and more particularly "middleware" matching software in the computer processing equipment according to the existing medium/long range communication drivers, controllers, wireless drivers and operation systems and development of new pairing specific services.

In addition, the prior art made available communication matching devices, and more particularly USB devices or communication cards which can be inserted into the port of a host processing unit such as a computer, a printer, a modem or equivalent devices, and which transform data received according to a protocol into another protocol which is compatible with the host processing unit.

In principle, these matching devices are equipped with a connection or an interface with the host unit, such as a USB, PCMCIA connection, as well as a connection or an interface for communicating with the outside, such as a wireless, NFC radiofrequency, Bluetooth, optical, infrared, etc. interface.

These matching devices generally include data processing means able to carry out a matching of exchange protocol and/or matching of formats of data to be exchanged between the portable device and the processing unit. They also include stating means for informing the processing unit on technical capacity of the portable device, so as to select appropriate communication means such as a communication driver. According to the USB standard, such capacities or identifiers are associated with values called "classes". A USB/Bluetooth key is thus, for instance, stated as a class corresponding to its own characteristics: a device having a Bluetooth communication interface.

The aim of the invention is to solve the above-mentioned problems.

The general purpose of the invention is a communication method and system between remote components or objects and a processing unit.

The purpose of the invention is also to develop a wireless mobile peripheral device, more particularly a badge holder, enabling remote components, such as a chip card, a multimedia card, associated with the mobile peripheral device, to communicate with a processing unit such as a local computer, via a wireless communication link such as Bluetooth, WiFi, ZigBee, Ultra Wide Band, etc.

According to a preferred embodiment, the invention consists in using an intermediary peripheral device (a matching device), positioned between the local computer and the wireless mobile peripheral device. During an exchange with the host computer, the matching supplies "conventional" characteristics representing the wireless mobile device and/or associated components and generally supported by the computer, and more particularly chip card (CCID) and/or mass storage interface characteristics.

For this purpose, the object of the invention is a matching device for carrying out data exchange between a processing unit and a wireless peripheral device and/or a communication object associated with the peripheral device,
said matching device including:
a communication interface with the processing unit;
a wireless communication interface with said wireless peripheral device;
information stating means for stating technical capacity information to the processing unit, enabling the latter to select an appropriate driver/communication means;
data-processing means, said means being capable of carrying out a matching of an exchange protocol and/or formats of data to be exchanged between the processing unit and the communication object.

The device is characterized in that said technical capacities stated by the stating means pertain to the wireless peripheral device and/or to the communication object associated therewith, said capacities being considered to pertain to the matching device by the processing unit.

According to other characteristics of the invention:
said technical capacities and/or formats of data are supported by the communication device itself;
said technical capacities and/or formats of data are supported by another object/component pertaining to said communication device;
said technical capacities and/or formats of data stated by the latter to the processing unit pertain to a chip card interface type and/or mass storage functionalities, so as to be virtually detected and considered by the processing unit as having such capacities and/or functionalities;
the matching device includes means pairing a second type of communication (BT).

Another object of the invention is a matching method for carrying out data exchange between a processing unit and a wireless peripheral device or a communication object associated with the peripheral device, with said method including the following steps:
stating information for stating technical capacity information to the processing unit, enabling the latter to select an appropriate driver/communication means,
data processing, said processing being able of carrying out a matching of an exchange protocol and/or formats of data to be exchanged between the processing unit and the communication object,
characterized in that said technical capacity information stated by the stating means pertains to the wireless peripheral device and/or to the communication object (OC, OC1, OC2) associated therewith, said capacities being considered to pertain to the matching device (DA) by the processing unit.

Another object of the invention also is a communication system between a processing unit and a wireless peripheral device and/or a communication object associated with the peripheral device, with said system including:
a peripheral device communication device having technical capacities and/or being capable of implementing a type of data format;
a processing unit able to implement or select an appropriate communication in response to information received concerning technical capacity and/or formats of data implemented or supported by the communication object;
the above-mentioned matching.

The host computer can thus communicate and exchange directly with the peripheral device using the operation system generic drivers without requiring a specific driver installation.

Thanks to the invention, no specific driver development or installation is required in the local computer. No specific modification of the "middleware" is required in the processing unit.

The solution can be directly used for an immediate deployment of a hands-free solution on a current chip card infrastructure. The invention may also be deployed, if need be, in computers without a wireless communication interface. Integrating this solution is easy, immediate and transparent for the final user.

Other particularities and advantages of the invention will appear when reading the following non limitative exemplary description and referring to the appended drawings, wherein.

Figure 1:
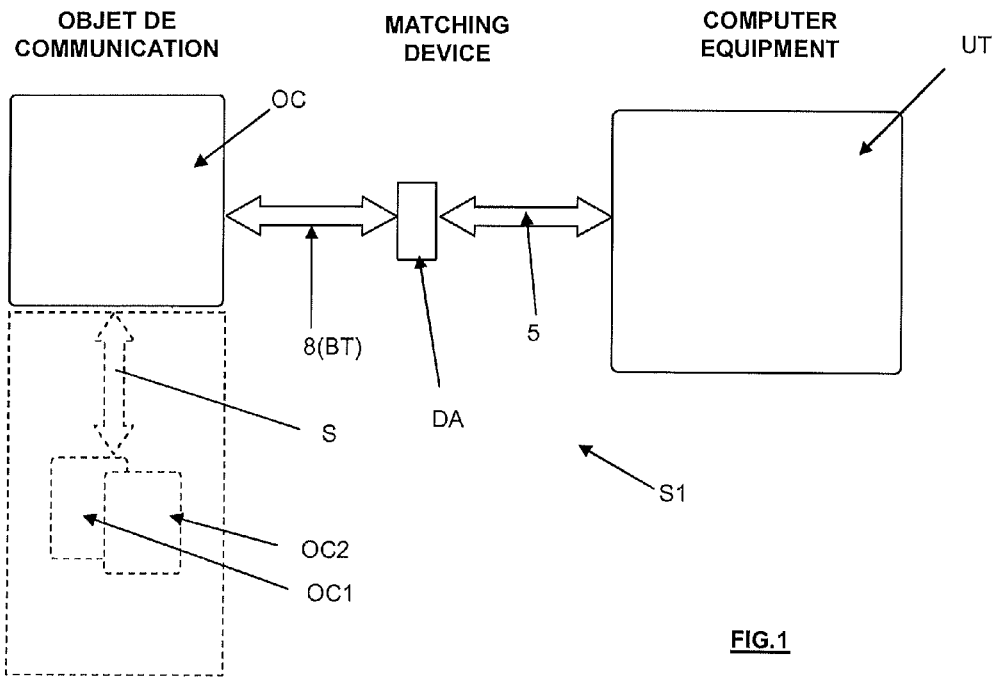
FIG. 1 illustrates a communication system according to a general embodiment of the invention.

In FIG. 1, a communication system S1, according to a general embodiment of the invention, includes a processing unit UT, a communication object OC, and a matching device DA. The system may also include, if need be (in dotted lines), at least one component OC1, OC2 pertaining to this communication object. For this purpose, a communication is set up between the object OC or OC1, OC2 and the processing unit through this matching device DA via communication channels 6, 5. The channels may be contact or wireless ones, etc.

A communication object, in this exemplary case, a card reader, may be any communicating object provided with a memory and a communication interface 6. For example, it can be a contact or contactless chip card, an electronic label, a reader, a smart key, a watch, a digital photo frame, a telephone, a camera, a video camera, a printer with or without a card reader.

Such objects or components have, each, proper technical capacities and implement protocols for exchanging specific data. The components are preferably cards inserted into the communication object, such as an ISO 7816 card or a mass memory card, but they can be of the same type as the communication object OC.

The processing unit or computer equipment UT is able to implement or select an appropriate communication in response to technical capacity information received from a peripheral device. This is in particular the case for the USB communication bus stating procedure, which enables the processing unit to select a "driver" and thus an associated command set support depending on the object class of the stating device.

The processing unit equipped with an interface 5 (BT) for communicating with the outside, in this case a personal computer or computer equipment PC, may be any processing unit, such as a PDA, a telephone, a camera, a video camera, a printer, etc.

The matching device enables the computer equipment to communicate with the object OC and/or one of the components OC1, OC2 pertaining to this object. The matching device DA is described hereunder while referring to FIG. 2.

Figure 2:
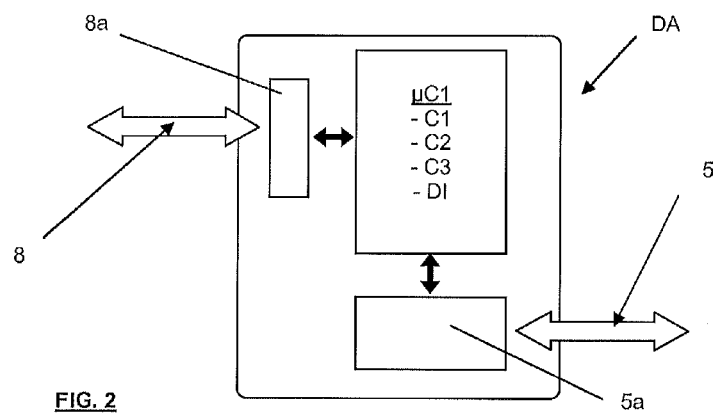
FIG. 2 illustrates a matching device according to one embodiment of the invention.

In FIG. 2, the exemplary matching device is a USB device provided with a Bluetooth physical interface 8a and a USB physical interface 5a, whether wire ones or wireless ones. It may include however other types of additional or subsiding interfaces, such as infrared, NFC, electric contact or contactless, identical or different interfaces, on both sides. Communication with the outside, and more particularly the object OC, is of the Bluetooth type, and with the processing unit of the USB type. The matching device is preferably close to the processing unit whereas the portable object is further away.

More particularly, the matching device DA is able to carry out operations enabling an easy-to-understand exchange of data between the communication object OC and the processing unit UT and/or reversely. For this purpose, it includes data processing means (µC). The means µC1 may include or build a microcontroller or equivalent wired means without a processor or integrated in a processor.

According to a preferred embodiment, such means are more particularly able to carry out a matching of the exchange protocol and/or matching formats of data to be exchanged, between the communication object OC and the processing unit UT, more particularly because of the execution of at least one programme C1, C2, C3, . . . , Cn for a protocol transcription/retrieval/encapsulation/transfer of exchanged data.

Such device DA also includes information stating means DI to give the processing unit information including or representing technical capacities and/or formats of data, so as to cause a selection of an appropriate communication driver in the processing unit and more widely communicate, more particularly with the matching device.

Such information DI may be a value stored in the microcontroller memory or a memory associated therewith, representing technical capacities or belonging to some category of device liable to be recognized by the processing unit, according to a standard. For a USB communication (and standard), information may correspond with the value of a class of a piece of equipment. If need be, information may reside at the interface 5a of the matching device with the processing unit.

Similarly, the processing unit operation system (FIG. 3), and more particularly "Windows XP", automatically includes the drivers corresponding to the various stated classes.

According to one characteristic of a preferred general embodiment of the invention (FIG. 1) the information mentioned or stated above to the processing unit UT, by the matching device DA, pertains to the communication object OC or at least to one component OC1, OC2, in relation with this object, as described above.

The capacities are considered by the processing unit as virtually pertaining to the matching device, while they belong to a distinct object. The processing unit dialogues with the device DA as though it were provided with such technical capacity or as though it belonged to the stated device category.

The matching device DA is able to analyse the various exchanges between the communication object OC and the processing unit UT, in order to maintain the current communication context. According to the embodiment, the device DA may or not intercept and answer some requests sent by the processing unit UT when the connection with the communication object OC is broken. In most cases, a notification is sent back by the matching device in order to inform that the request has been rejected and/or that the communication object is temporarily not accessible. This is the case, more particularly, for exchanges of the commands/answers types, wherein the driver of the processing unit keeps awaiting the answer from the peripheral device.

According to a first embodiment, the technical capacities or formats of data are supported by another device/object/ device pertaining to, or constituting the communication object OC. Such embodiment may correspond to a particularly preferred embodiment of the invention according to which the communication is, for instance, an ISO 7816 card and/or mass memory reader, for example of the SD type, as illustrated subsequently.

In the preferred example, the information DI pertaining to the technical capacities and/or formats of data, as stated to the processing unit is specific to a chip card interface (CCID) type and/or mass storage (MS) functionalities. Thus the matching device, when positioned in the vicinity, can be virtually detected and considered by the processing unit as having the capacities and/or the functionalities of a device or an object positioned at a distance from the processing unit.

According to a second embodiment, the communication object supports said technical capacities or formats of data. For instance, the object may be a device including a chip of the chip card type having a chip welded or permanently fixed in the device, a welded memory card, a hard disk . . . .

In other embodiments, the object OC may be a card or any remote or not communicating device, more particularly using Bluetooth and or NFC radiofrequency channel or according to ISO 14443.

Figure 3:
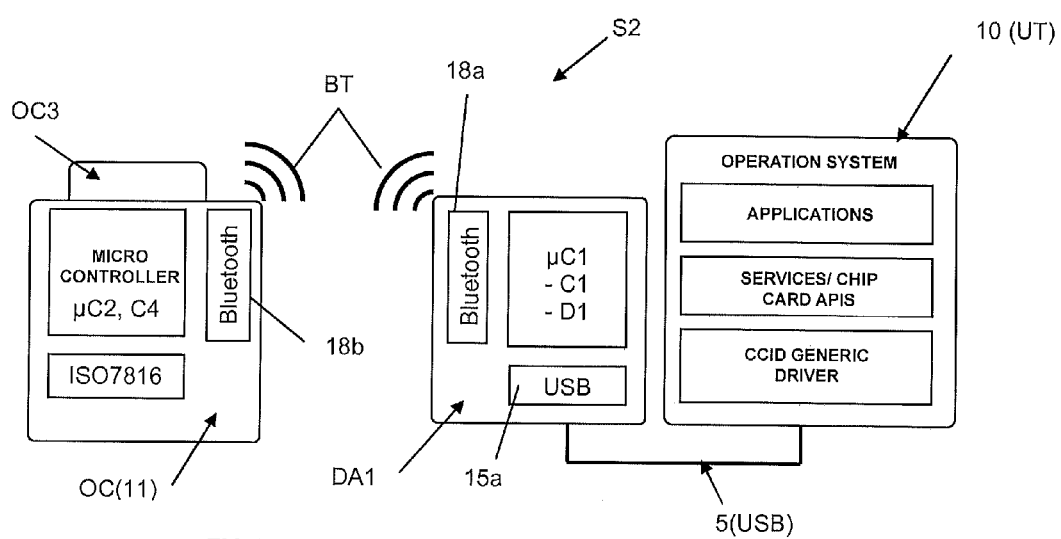
FIG. 3 illustrates a communication system according to another embodiment of the invention.

FIG. 3 shows another exemplary preferred implementation of a system S2 according to the invention, using a mobile chip card reader having a "Bluetooth" radiofrequency interface.

The aim of the example is to provide a solution enabling to route data or codes between computer equipment 10 and a mobile chip card reader 11, through a matching device DA1 or a so-called "matching" USB peripheral device.

This matching device DA1 advantageously includes communication interfaces compatible with the standard applicative communication interfaces currently deployed and more particularly an interface with the processing unit. According to one embodiment, it more particularly includes a short or medium range wireless link (BT) and an interface 15a with the computer equipment.

In this example, the matching device DA1 is equipped with a slave USB wire interface 15a enabling to exchange data frames with the master computer equipment, with the frames being formatted according to the CCID specification. It also includes a radiofrequency interface 18a enabling to exchange data frames with the mobile distant peripheral device 11 or OC3, and formatted according to the Bluetooth specification). It includes a microcontroller μC1 the role of which consists in encapsulating/de-encapsulating and transferring the data frames between the wire and radiofrequency interface.

According to this embodiment, the matching device DA1 is equipped with a CCID specification compatible applicative communication interface 19. The matching device then appears to the computer system as being virtually a chip card reader. It more particularly transmits a code of the class corresponding to the chip card reader the information required for setting the protocol layer, as well as the various software and/or physical characteristics of said device which are interpreted by the processing unit to select the required driver and/or physical interface.

The mobile peripheral device 11 thus includes a portable chip card reader, wherein the user's chip card OC3 has been inserted. The reader transmits in return the exchanges between the chip card and the remote computer equipment through a wireless "Bluetooth" interface 16b.

According to one operation of this example, the matching device DA1 encapsulates the CCID protocol data intended for the reader, in the protocol used by the short or medium range wireless link (Bluetooth). Such operation is executed here by the microcontroller μC1 of the matching device or, in an equivalent way, by a protocol transcriber or means for encapsulating the formats of data and/or the implementation of an application layer carrying out this operation. A complete frame, here according to the CCID protocol is then transmitted by a radiofrequency channel to the chip card OC3 mobile reader 11. This operation is called "encapsulation" (tunneling) of CCID frames.

In parallel, the mobile chip card reader DA1 includes a short and medium range interface (Bluetooth) 18b and processing means μC2, a programme C4 in order to collect and de-encapsulate, respectively, the frames received from the matching device, in order to transmit them in turn to the chip card OC3.

On the contrary, frames using the CCID protocol of the communication object OC, or more particularly the chip card OC3 intended for the processing unit 10 can be encapsulated by means μC2, C4 to be transmitted or transported via the Bluetooth interface 18b intended for the processing unit. Such frames are then retrieved by the Bluetooth interface 19a of the matching device DA1, then extracted or de-encapsulated by the processing means μC1, the program C1, qui can be of the same (or an equivalent) type as those μC2, C4 of the communicating object.

CCID protocol or format frames are then transmitted to the processing unit 10 via the USB interface by the matching device DA1. The processing unit shall first have selected the driver or the standard application able to interpret the CCID frames more particularly upon the first connection of the matching device to the processing unit.

The invention makes it possible to make the short or medium range wireless communication between the communication object and the processing unit totally transparent (or not existing). This is obtained without any applicative modification in the processing unit since the invention uses standard applicative communication interfaces, supported by the processing unit, such as USB and CCID.

In this example, the computer equipment 10 is composed of standardized software components, more particularly applications, services/chip card APIs, CCID generic driver, without any addition of an application or a driver required for implementing the communication with the communication object OC or OC3.

Figure 4:
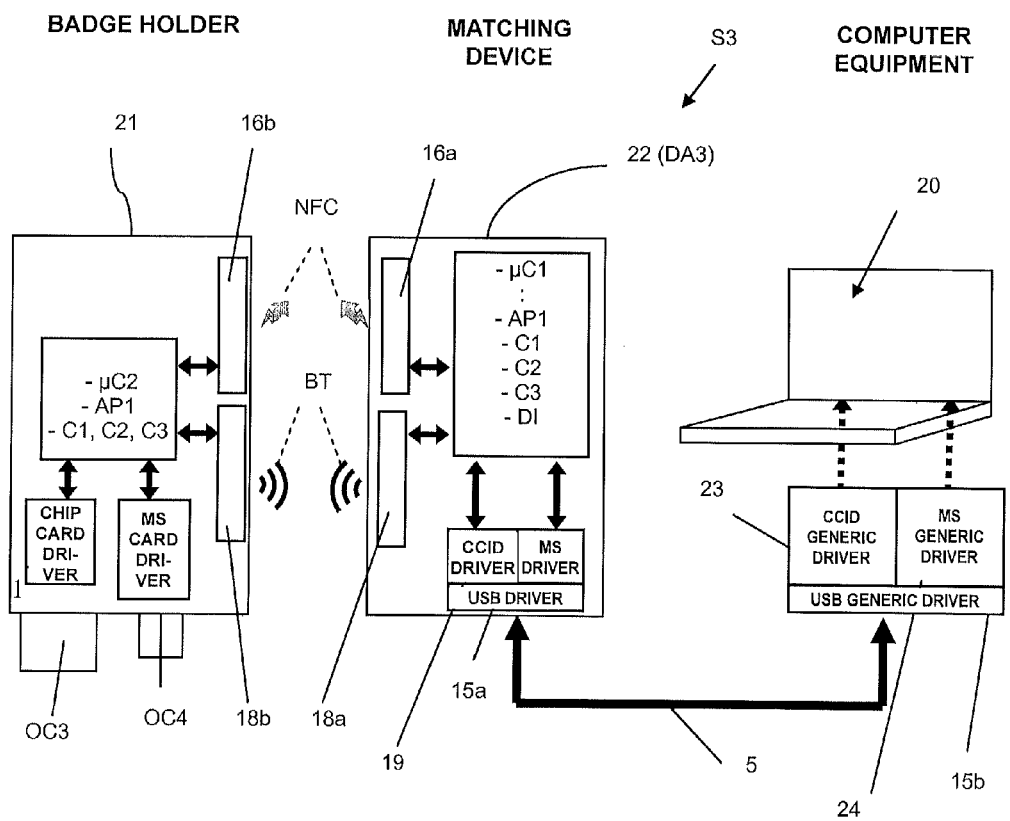
FIG. 4 illustrates a communication system according to a secure, more complete embodiment of the invention.

In FIG. 4, according to a more secure and wider embodiment of the invention, the system (or method) S3 makes it possible to communicate by implementing a security step of a first wireless communication with a remote object, and if need be, directly or not with objects or a different type OC3, OC4 and/or through a communication object OC or not. The security step may however be implemented even with only one object among OC, OC1, OC2, OC3, OC4.

As regards security, the invention implements means for initiating and/or setting up a second communication type (BT) between the matching device and the communication device or object associated therewith. Then, instead of providing security means equivalent to the processing unit 20 level, which would make the security operation complex (new driver, new application, more particularly the pairing one, . . . ) such security means are provided between the communication object and the matching device.

According to a security embodiment, the invention includes means for pairing AP1 the second communication (NT) type. Other secure communication means can be provided for, such as for example the user entering a secret code if the devices are equipped with a user interface of the display and keyboard type, and, if need be, the ciphering/deciphering of exchanged data.

According to a preferred embodiment, the pairing means implement or use a third short/medium range communication (NFC) type. An exchange of secret and/or key occurs between the matching device and the associated object via such short range communication (NFC) in order to secure the second communication BT between the matching device and the communication object. The third communication (NFC) type preferably has a shorter range than that of the second communication (BT) type.

The communication object 21 includes a card reader OC3, OC4, a wireless (Bluetooth) communication link 18b, a short range communication (NFC) link 16a. In the example, the reader is in fact a badge holder, with the badge being a chip card OC3.

The matching device includes equivalent or identical means described in the previous Figure (with the same references indicating the same means), and also a wireless communication link (Bluetooth) 18a, a short range communication (NFC) link 16a and a communication, more particularly USB, link 15a, with the host computer 20, a microcontroller μC2, chip card and mass memory MS drivers.

The matching device also includes one or several microprograms AP1, C1, C2, C3, C4 and is in charge of managing a complete pairing sequence NFC with the card reader 21 (which includes additional means AP2), of starting a secure Bluetooth connection with the reader, of transmitting the CCID stating and/or mass storage MS information DI to the processing unit and of exchanging data packets or frames between the reader and the host computer C1, C2.

Such programmes make it possible, as before, to carry out an encapsulation operation on the Bluetooth protocol/de-encapsulation operation of the Bluetooth protocol of the respectively sent/received frames, whether the latter have a chip card format or a mass memory SD format.

During the stating step, as mentioned above, the matching device states to the host computer information pertaining to a chip card interface (CCID) type and this time, too, mass storage (MS) functionalities.

The host computer having actuated the generic drivers 23, 24 or the corresponding applications further to the stating, it is able to immediately communicate with the remote communication object without any addition of a driver. Then the host computer can directly communicate and exchange with the chip and SD type card reader, by using the generic drivers of the operation system (it is not necessary to install a specific driver).

According to this operation principle, the host computer just "detects" a chip card reader and/or a hard disk or a mass memory connected to its USB port 15*b*.

The method for enabling an exchange of data between a communication object and a processing unit includes a step of stating to the processing unit, in order to inform the processing unit on technical capacities and/or formats of data in order to implement an appropriate communication.

The matching device includes information stating means DI, pre-set or adjustable by the user, according to the communication object to be associated with the matching device 21. Such stating means can be automatic, for example, further to an exchange with an associated communication object OC, OC3, OC4, and the object may more particularly state its characteristics to the matching device through one of the available interfaces.

In an alternative solution, the user may select, on the matching device, an operation and/or values representing characteristics (class of the communication object), or even load programs (security, driver . . . ) pertaining to the associated communication object. The stating information can also be triggered by the detection, by the reader, that any card or any other object pertaining to the reader has been inserted into or is present in the reader. In the example, the matching device has been factory-programmed with information to be stated corresponding to the ISO 7816 and SD card types intended to be inserted into the badge holder.

Then upon connecting the matching device and the processing unit, the matching device states, through a transmission to the processing unit, a piece of information DI pertaining to the technical capacities or formats of data pertaining to a chip card interface (CCID) type and/or mass storage (MS) functionalities.

Then the matching device is virtually detected and considered by the processing unit as having the capacities and/or functionalities of an ISO card or a mass memory SD card or more exactly as an ISO card or SD card reader. The computer can then implement corresponding software and/or physical drivers/interfaces.

During the communication with the processing unit, the matching device proceeds to a transparent processing of data, which consists in carrying out, as mentioned above, a matching of the exchange protocol and/or matching the format of data to be exchanged. For instance, the matching device receives frames or data packets in the ISO 7816 chip card format or intended to an ISO 7816 chip card from the host unit 20.

The matching device then proceeds to a protocol and/or format of data matching operation. The frames received from the processing unit 3 are encapsulated to the format or according to the communication protocol existing between the matching device and the associated object, and more particularly here, in the example, the Bluetooth protocol. Another communication of the contact type is not excluded, however.

The frames of data complying with ISO 7816 or adapted to the CCID interface are encapsulated and transmitted by the matching device via the Bluetooth interface thereof.

Encapsulated data is received by the associated communication object, here the badge holder reader, on its Bluetooth interface and processed thereby so as to retrieve the encapsulated data and transmit it to the ISO 7816 chip card.

The invention proceeds similarly for data intended for the card SD. The host unit implements the corresponding means, and more particularly the standard driver MS, the mass memory or the hard disk. Similarly, the matching device carries out the encapsulation and de-encapsulating operation on frames in the mass memory MS format.

The badge holder reader proceeds similarly to an encapsulation/de-encapsulation of the frames of the mass memory MS type in order to, respectively, transmit them, as Bluetooth, to the matching device, as originating from the card or as MS frames to the SD card, as originating from the matching device. The reverse operation of data flow is provided in the badge holder, if need be.

Prior to such exchanges, the matching device preferably provides for pairing the communications, and more particularly Bluetooth. For this purpose, the matching device initiates a third communication, more particularly of the short range type, here in the example, a NFC type communication with the badge holder. The matching device also makes a pairing consisting in exchanging secrets or keys enabling a secure, more particularly Bluetooth communication. In an alternative solution, such pairing can be initiated and managed by the badge holder.

The invention makes it possible to avoid any modification in the processing unit 20 to carry out the securisation of exchanges, more particularly through Bluetooth. More particularly, no software matching of the processing unit is required. The user just has to connect the matching device to the processing unit to set up a secure communication with one of the two cards of the badge holder reader.

The invention claimed is:

1. A matching device for carrying out data exchange between a processing unit and a wireless peripheral device and/or a communication object associated with the peripheral device,
    said matching device including:
        a communication interface with the processing unit;
        a wireless communication interface with said wireless peripheral device;
        information stating means for stating technical capacity information to the processing unit, enabling the latter to select an appropriate driver/communication means; and
        data-processing means for carrying out a matching of an exchange protocol and/or formats of data to be exchanged between the processing unit and the communication object,
    wherein the technical capacities stated by the stating means pertain to the wireless peripheral device and/or to the communication object associated therewith, said capacities being considered to pertain to the matching device by the processing unit.

2. A device according to the claim 1 wherein the technical capacities and/or formats of data are supported by the communication device itself.

3. A device according to claim 1 wherein the technical capacities and/or formats of data are supported by another object/component in relation with the communication device.

4. A device according to claim 1 wherein the technical capacities and/or formats of data stated to the processing unit relate to a chip card interface type and/or mass storage functionalities, so as to be virtually detected and considered by the processing unit as having such capacities and/or functionalities.

5. A device according to claim 1 wherein the device includes means for initiating and/or setting up a second type of communication with the communication device.

6. A device according to claim 5 wherein the device includes means for pairing the second communication type.

7. A device according to claim 6 wherein the pairing means are applied to a third short/medium range communication type.

8. A device according to claim 5 wherein the second communication type has a greater range than the third communication type.

9. A device according to claim 1 wherein the peripheral device is a chip card and/or mass storage card reader.

10. A matching method for carrying out data exchange between a processing unit and a wireless peripheral device and/or a communication object associated with the peripheral device, with said method including the following steps:
- stating information for stating technical capacity information to the processing unit, enabling the latter to select an appropriate driver/communication means, and
- data processing, said processing being able of carrying out a matching of an exchange protocol and/or formats of data to be exchanged between the processing unit and the communication object,
- wherein the technical capacity information stated by the stating means pertains to the wireless peripheral device and/or to the communication object associated therewith, the capacities being considered to pertain to the matching device by the processing unit.

11. A communication system between a processing unit and a wireless peripheral device and/or a communication object associated with the peripheral device, which includes:
- a peripheral device communication device and/or components pertaining to said peripheral device having technical capacities,
- a processing unit able to implement or select an appropriate communication in response to technical capacity information received, and
- the matching device according to claim 1.

12. A device according to claim 2, wherein the technical capacities and/or formats of data are supported by another object/component in relation with the communication device.

13. A device according to claim 3, wherein the technical capacities and/or formats of data are supported by another object/component in relation with the communication device.

14. A device according to claim 2, wherein the technical capacities and/or formats of data stated to the processing unit relate to a chip card interface type and/or mass storage functionalities, so as to be virtually detected and considered by the processing unit as having such capacities and/or functionalities.

15. A device according to claim 3, wherein the technical capacities and/or formats of data stated to the processing unit relate to a chip card interface type and/or mass storage functionalities, so as to be virtually detected and considered by the processing unit as having such capacities and/or functionalities.

16. A device according to claim 2, wherein the device includes means for initiating and/or setting up a second type of communication with the communication device.

17. A device according to claim 3, wherein the device includes means for initiating and/or setting up a second type of communication with the communication device.

18. A device according to claim 4, wherein the device includes means for initiating and/or setting up a second type of communication with the communication device.

* * * * *